(12) United States Patent
McElroy

(10) Patent No.: US 6,240,649 B1
(45) Date of Patent: Jun. 5, 2001

(54) SIGHTING ASSEMBLY

(76) Inventor: Paul T. McElroy, P.O. Box 2453, Evanston, WY (US) 82931

( * ) Notice: Subject to any disclaimer, the term of this patent is extended or adjusted under 35 U.S.C. 154(b) by 0 days.

(21) Appl. No.: 09/329,373

(22) Filed: Jun. 10, 1999

(51) Int. Cl.[7] .................................................. G01C 15/00
(52) U.S. Cl. .............................. 33/286; 33/390; 33/451; 33/452; 33/471; 33/484; 33/529; 33/DIG. 21
(58) Field of Search .............................. 33/286, 333, 354, 33/370, 371, 390, 412, 451, 452, 465, 471, 484, 492, 529, DIG. 21

(56) References Cited

U.S. PATENT DOCUMENTS

| | | | |
|---|---|---|---|
| 4,144,650 | * | 3/1979 | Rawlings et al. .......................... 33/88 |
| 4,394,801 | * | 7/1983 | Thibodeaux ............................ 33/496 |
| 4,693,011 | * | 9/1987 | Strayham ................................ 33/451 |
| 4,744,152 | * | 5/1988 | Roach et al. ........................... 33/471 |
| 5,239,761 | * | 8/1993 | Wu et al. ................................ 33/451 |
| 5,452,522 | * | 9/1995 | Kook et al. ............................. 33/451 |
| 5,586,395 | * | 12/1996 | Malczewski ............................ 33/471 |
| 5,604,987 | * | 2/1997 | Cupp .................................. 33/275 R |
| 5,669,149 | * | 9/1997 | Meitzler ................................ 33/471 |
| 5,749,152 | * | 5/1998 | Goss et al. ............................ 33/381 |
| 5,839,201 | * | 11/1998 | Young ................................... 33/451 |
| 6,104,480 | * | 8/2000 | Matzo et al. .......................... 33/471 |

* cited by examiner

Primary Examiner—Randy W. Gibson
(74) Attorney, Agent, or Firm—Quirk & Tratos

(57) ABSTRACT

A sighting assembly for providing a reference laser beam in the course of connecting pipe segments to each other includes an elongate body in which a laser pointing course is received and which is pivotally engaged at its front end to an straight edged arm. The body may further include a magnetic compass and a level assembly, both proximate its rear end, to provide a visual indication of the azimuth and inclination thereof. These are achieved by an azimuth ring on the compass projecting into lateral cutouts in the body for manipulative convenience. In one example the arm supports two spaced posts, each including spaced projections for contacting the pipe segment, and when the arm is collapsed below the body for storage the posts are received in the cutouts.

10 Claims, 3 Drawing Sheets

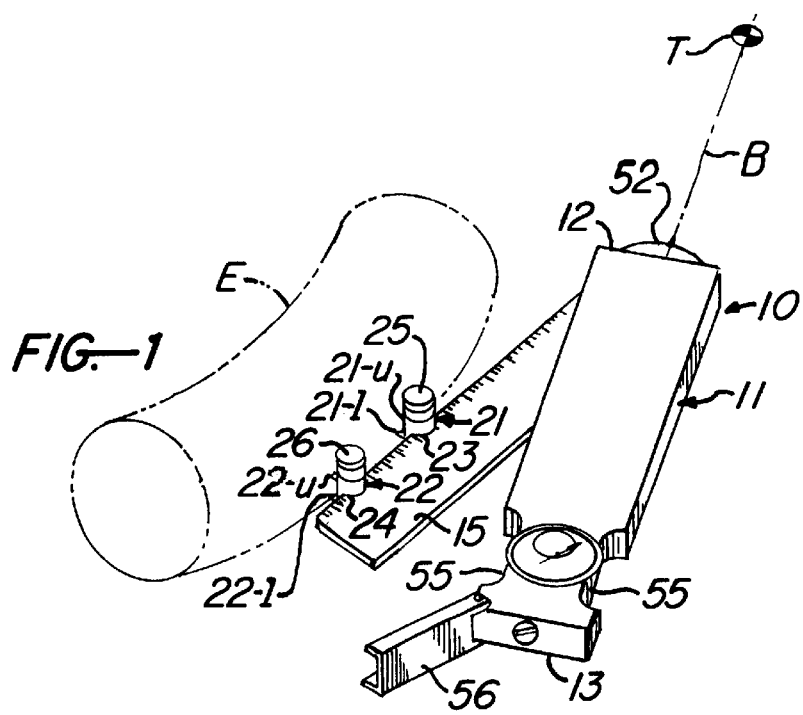
FIG.—1
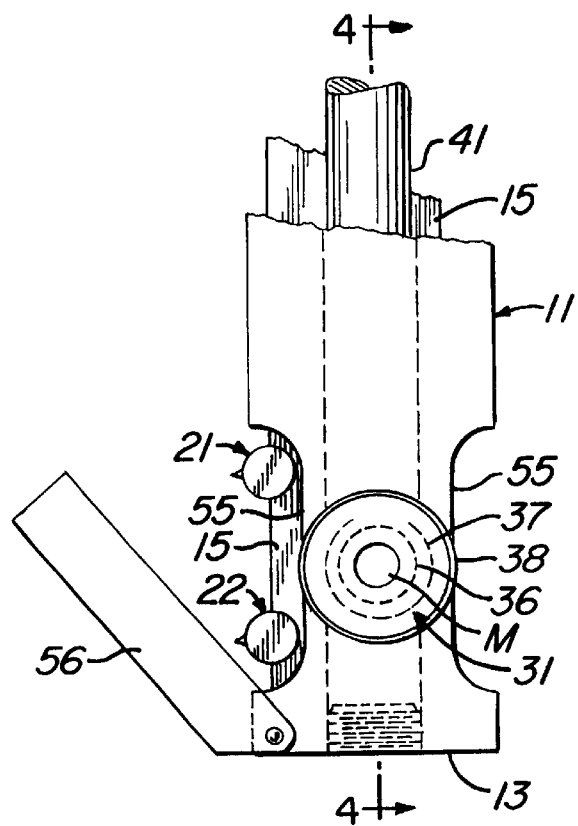
FIG.—2

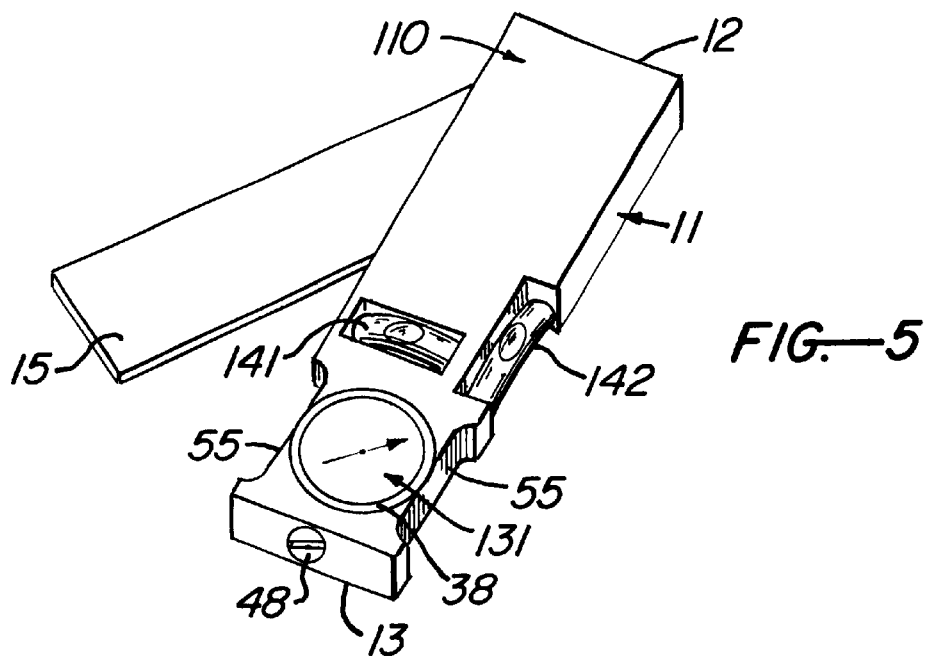
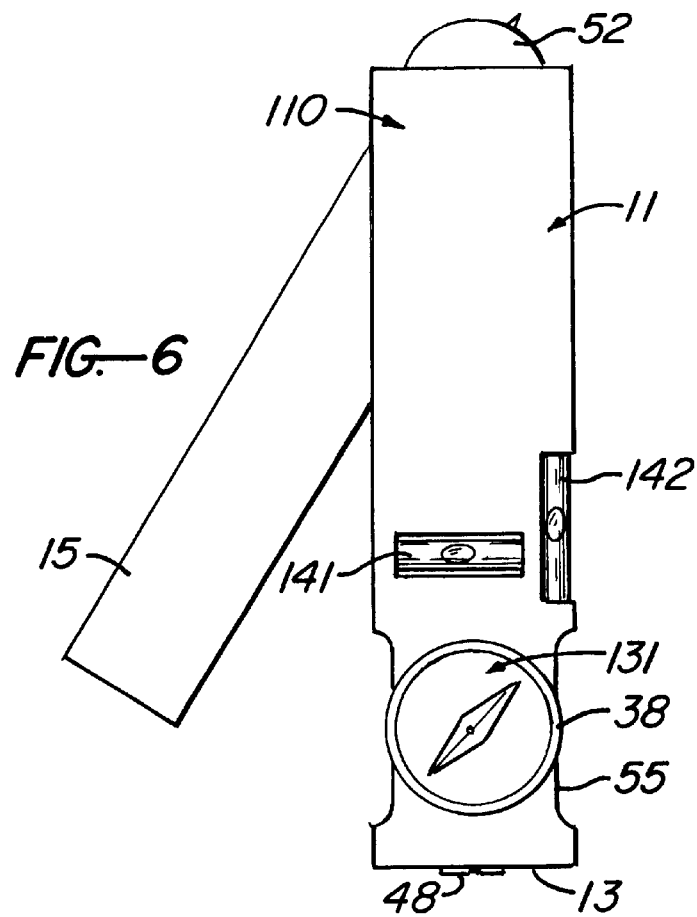

SIGHTING ASSEMBLY

BACKGROUND OF THE INVENTION

1. Field of the Invention:

The present invention relates to sighting devices, and more particularly to laser beam sighting assemblies useful in aligning pipe segments and flanges in the course constructing a pipeline.

2. Description of the Prior Art

The process of constructing a pipeline or pipe run often entails a sequence of welds in which long segments of pipe are joined to bend segments and flanges. In this process the accumulated build up of welding tolerances and welding heat distortions require continuous realignment sighting, with compensating grinding adjustments made at each weld joint. Thus the pipe fitter is constantly measuring angles, adjusting the weld lines and re-sighting in order to obtain a proper drainage slope and a true flange surface at the end of a run.

Maintaining a proper slope and flange surface alignment is particularly difficult at a pipeline bend. Here the length tolerances compound the angular tolerances and the pipe fitter therefore needs to adjust both the length and the angular segment of the bend to maintain slope and flange geometry. In this setting various sightings are taken along the pipe and the bend segments which with the use of trigonometry resolve the final flange joint plane.

This cumbersome process renders any construction assignment in which the pipe run needs to drain in a particular direction both difficult and geometrically indeterminate. For example, typical drain slopes are ⅛ or ¼ inch per foot and any distortion or misalignment of the bend can form undrained traps or pockets that promote corrosion. Thus a continuing requirement subsists for a quick verification of the slope and its general direction as the pipe segements are welded.

Heretofore various surveying assemblies have been devised which in one or another manner provide accurate measurement of the various geometrical points and lines. Examples of such surveying assemblies are shown in U.S. Pat. No. 3,813,170 to Sears; U.S. Pat. No. 3,897,637 to Genho; U.S. Pat. Nos. 4,973,158 to Marsh; and 5,218,770 to Toga. While each describes an accurate surveying instrument, the precise and complex surveyor's procedure is not practical at each weld and therefore primarily useful to set the end references or the reference line. Alternatively, portable measuring devices have been developed incorporating complex electronic systems that render convenient most remote measuring tasks, exemplified in U.S. Pat. Nos. 5,075,977, 5,287,627 and 5,182,863, all to Rando. While suitable for the purposes intended each of the foregoing entails complex precision instrumentation that is expensive to produce and maintain and subject to damage.

A simple, inexpensive and rugged sighting assembly particularly suited to the quick slope and azimuth adjustments made in the course of welding a pipe run is desired and it is one such assembly that is disclosed herein.

SUMMARY OF THE INVENTION

Accordingly, it is the general purpose and object of the present invention to provide a sighting assembly useful in determining the general slope of pipe bend segments in order to align the end flanges of a pipeline.

Other objects of the invention are to provide a simple and rugged sighting assembly useful in the construction of pipelines.

Yet further objects of the invention are to provide a portable sighting assembly conformed for quick resolution of geometry in the course of constructing a pipeline.

Briefly these and other objects are accomplished within the present invention by providing a portable sighting assembly characterized by an elongate body including a pivot proximate one end from which an arm of a protractor is frictionally deployed. A laser beam pointer is fixed to in the body, aligned along the primary axis thereof, adjacent a hemispherical level vial for defining a level plane. This level may be part of a magnetic compass assembly, imbedded in the dial cover lens thereof, and may include concentric scribes or markings indicating the slope. An adjustable azimuth ring surrounding the lens vial then assists in defining the magnetic direction of the slope, the ring extending into two opposed lateral recesses formed in the sides of the body for manipulative convenience.

To align the inventive sighting assembly against the exterior surface of a pipe bend segment the arm may be provided with a thumb screw affixed forward and rear bracket selectively securable along the length of the arm edge, each deploying a corresponding vertically spaced pair of contact points for contacting the measured surface. The spacing between the brackets together with the dimension of the contact points combine to define a measuring cage selected to match the pipe diameter and bend radius, thereby providing a convenient set of contacts for aligning the sighting assembly on the pipe. When the protractor arm is collapsed into the profile of the body these brackets are then received in the recesses on the sides of the compass azimuth ring.

A second, even more rugged, sighting assembly may be provided with two orthogonal level vials along and across the longitudinal dimension of the body, again in visual proximity with the magnetic compass. The compass is once more aligned between the lateral recesses to expose the edge of the azimuth ring. In this implementation the protractor arm may be useful without the brackets, functioning as an alignment guide along the pipe exterior.

BRIEF DESCRIPTION OF THE DRAWINGS

FIG. 1 is a perspective illustration of the inventive sighting assembly deployed for alignment on a pipe bend segment;

FIG. 2 is a top view detail of a magnetic compass provided with a hemispherical level vial in the lens thereof, in accordance with the present invention;

FIG. 5 is a further perspective illustration of an alternative embodiment of the inventive sighting assembly conformed for rugged applications; and FIG. 6 is a top view of the inventive sighting assembly shown in FIG. 5.

DESCRIPTION OF THE PREFERRED EMBODIMENTS

Figure 3:
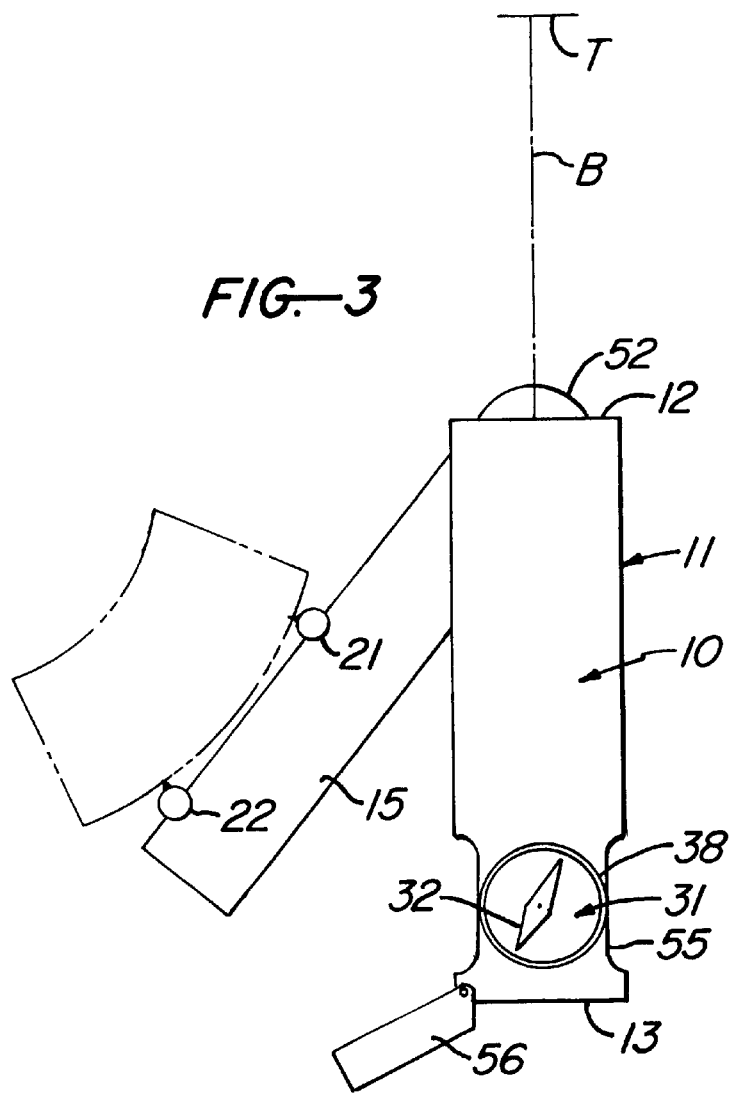
FIG. 3 is a geometric layout illustrating the manner of use of the inventive sighting assembly.
Figure 4:
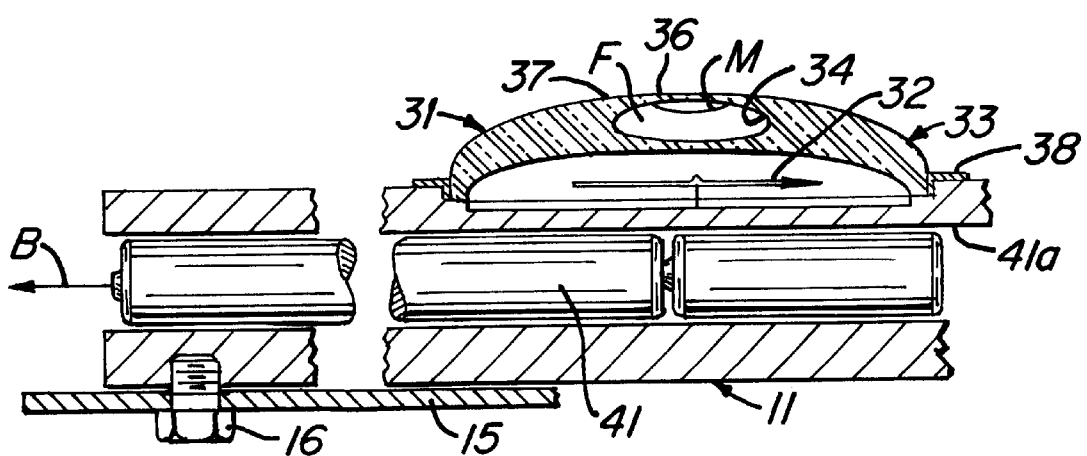
FIG. 4 is a sectional view detail taken along line 4—4 of FIG. 2.

As shown in FIGS. 1–4, the inventive sighting assembly, generally designated by the numeral 10, includes a rectangular body 11 defined by a forward end 12 and a rear end 13. A pivoted arm 15, in the form of a straight edge, pivots from a frictional pivot 16 proximate the forward end 12 of the body 11, subjacent the lower surface thereof. A pair of sliding bracket posts 21 and 22 are each provided with a lateral recess 23 and 24 conformed to receive the exterior edge of arm 15 and are therefore slidably engaged thereto. Each post 21 and 22 may be provided with a corresponding thumb screw 25 and 26 extendable into the lateral recess, useful in securing the posts along the arm edge. Each post 21 and 22, moreover, may include a corresponding upper and lower measurement pin 21-u, 21-l, 22-u and 22-l, forming the corners of a virtual measurement surface reference which can then be applied to the exterior of a pipe elbow E or a straight pipe segment (not shown).

One will note that the four-cornered reference plane defined by the measurement pins 21-u through 22-1 is of necessity symmetrical about the plane of arm 15. Accordingly when placed to the exterior of a convex outer surface of the elbow E this measurement cage will also tend to 'find' the plane of symmetry of the elbow. This virtual measurement cage, moreover, can be adapted to larger or smaller elbows by the sliding separation of the posts along the arm.

Body 11, in turn, may be provided with a compass assembly 31 imbedded generally rearwardly therein, defined by a magnetic compass needle 32 covered by a hemispherical lens structure 33 with a central cavity 34 partly filled with fluid F to form a level. The exterior of the lens structure 33 may be scribed with concentric scribe rings 36 and 37 corresponding, for example, the deviation of the level meniscus M from horizontal to 1/8 or 1/4 inch to the foot slope. An adjustable azimuth ring 38 is then engaged to surround the compass assembly, ring 38 being of a diameter slightly larger than the local width of the body, as reduced in dimension by a pair of opposed lateral cutouts 55 to expose the ring for manipulative convenience.

A laser pointer 41 may be received within a longitudinal drilling 41a extending through the body 11 to emit through end 12 a beam B to a target T in the desired direction of drainage. This beam arrangement is aligned relative the pipe segment by the pivoted arm 15 with the posts 21 and 22 placed relatively far rearwardly along the arm in order that the beam path be sufficiently removed from the elbow end for all realistic slope measurements and to separate as far as practical the magnetic compass from any ferrous mass. The forward end 12, moreover, may be provided with a protractor surface 52 against which an end extension of arm 15 is displayed, thereby providing a visual indication of the limits of practical slope measurement.

It should be noted that posts 21 and 22 may engage either one of the edges that define arm 15, and the assembly is therefore useful for opposite pipe bends, achieving universal application in laying out pipe runs. This reversible function is further accommodated by the opposed cutouts 55 into which the posts 21 and 22 are received once the device is collapsed.

Thus the foregoing assembly may be rendered collapsible for convenient portability by way of cutouts 55 in the lateral edges of the body, which also serve to expose the azimuth ring. These same cutouts 55 may be covered with pivoted covers 56 to shield the respective pins during transport. In this manner a simple, rugged and inexpensive sighting assembly is provided which is particularly useful in pipe work.

By reference to FIGS. 5 and 6, an even more rugged and simple sighting assembly is provided, generally designated by the numeral 110. Like numbered parts functioning in like manner to that previously described, assembly 110 once again includes a body 11 provided with a pivoted arm 15 in the form of a straight edge pivoted from the end 12, and a compass assembly 131 again received proximate the other end exposing an azimuth ring 38 into opposed cutouts 55. In distinction to the compass assembly 31, the instant assembly 131 does not include the leveling bubble in the lens thereof, the body 11 instead including, two orthogonal level vials 141 and 142, respectively across and along its longitudinal dimension.

To maximize viewing convenience level vial 142 may be bedded in a longitudinal edge of body 11, generally in the middle of the length thereof, and is thus exposed for viewing from several directions. Similarly, vial 141 may be exposed through the surfaces of body 11 and through the opposite edge. This arrangement allows for quickly deployed sighting device with minimal adjustment and reference points, Within the range of the above described embodiments and examples it is both useful and advantageous to omit the posts 21 and 22 while retaining the structure of compass assembly 31, or to combine the structure of the level vials 141 and 142 with compass assembly 131 while also retaining the posts 21 and 22 on arm 15. In both examples, moreover, the removal and replacement of the laser pointer 41, or any of its batteries (not shown) from the bore 41a may be facilitated by a threaded plug 48 closing the bore opening in the end 13 fixed by a set screw 49. In this manner a convenient, rugged and inexpensive sighting assembly is devised whin in its several forms can achieve various levels of precision. Of course, non-ferrous material structures are useful herein to limit any unwanted influence on the magnetic compass, while the arm deployment maximizes separation from any ferrous pipe segments.

Obviously many modifications and variations of the above teachings may be carried out without departing from the spirit of the present invention. It is therefore intended that the scope of the invention be determined solely by the claims appended hereto.

It is claimed:

1. A sighting assembly useful in aligning pipe segments, comprising:

an elongate body defined by a front end and a rear end, said body including a longitudinal bore extending between said front and rear ends;

a laser beam source received in said bore and aligned to project said beam through said front end of said body;

a straight edged arm pivotally attached to said body proximate said front end thereof for pivotal deployment at various selected angles relative said body;

a magnetic compass assembly mounted in said body proximate the rear end thereof, said compass assembly including an azimuth ring conformed for selective rotary alignment; and level means operatively attached adjacent said compass assembly for providing a visual indication of the alignment of said body relative horizontal.

2. Apparatus according to claim 1, further comprising:

protractor means formed on said body at said front end thereof for providing a visual reference indicative of the angular displacement of said arm relative said body.

3. Apparatus according to claim 2, further comprising:

closure means receivable in said bore proximate the rear end of said body.

4. A sighting assembly useful in aligning pipe segments, comprising:

an elongate body defined by a front end and a rear end, said body including a longitudinal bore extending between said front and rear ends intermediate the lateral edges thereof, said lateral edges including opposed cutouts proximate said rear end;

a laser beam source received in said bore and aligned to project said beam through said front end of said body;

a straight edged arm pivotally attached to said body proximate said front end thereof for pivotal deployment at various selected angles relative said body;

a magnetic compass assembly mounted in said body proximate the rear end thereof, between said opposed cutouts, said compass assembly including an azimuth ring partly projecting into said opposed cutouts for selective manual engagement to effect rotary alignment thereof; and level means operatively attached adjacent said compass assembly for providing a visual indication of the alignment of said body relative horizontal.

5. A sighting assembly according to claim 4, further comprising:

a first and second post selectively securable to an edge of said pivotal arm generally orthogonal to the plane thereof, each post including spaced measurement projections for alignment relative said pipe segments.

6. Apparatus according to claim 5, further comprising:

protractor means formed on said body at said front end thereof for providing a visual reference indicative of the angular displacement of said arm relative said body.

7. Apparatus according to claim 6, further comprising:

closure means receivable in said bore proximate the rear end of said body.

8. A sighting assembly useful in aligning pipe segments, comprising:

an elongate body defined by a front end and a rear end, said body including a longitudinal bore extending between said front and rear ends intermediate the lateral edges thereof, said lateral edges including opposed cutouts proximate said rear end;

laser beam source received in said bore and aligned to project said beam through said front end of said body;

a straight edged arm pivotally attached to said body proximate said front end thereof for pivotal deployment at various selected angles relative said body;

a first and second post selectively securable to an edge of said pivotal arm generally orthogonal to the plane thereof, each post including spaced measurement projections for alignment relative said pipe segments;

a magnetic compass assembly mounted in said body proximate the rear end thereof, between said opposed cutouts, said compass assembly including an azimuth ring partly projecting into said opposed cutouts for selective manual engagement to effect rotary alignment thereof; and level means operatively attached adjacent said compass assembly for providing a visual indication of the alignment of said body relative horizontal.

9. Apparatus according to claim 8, further comprising:

protractor means formed on said body at said front end thereof for providing a visual reference indicative of the angular displacement of said arm relative said body.

10. Apparatus according to claim 9, further comprising:

closure means receivable in said bore proximate the rear end of said body.

\* \* \* \* \*